United States Patent Office 3,438,813
Patented Apr. 15, 1969

3,438,813
BATTERY CELL DEPOLARIZERS
Stanley M. Davis, Bridgewater Township, Somerset County, N.J., assignor to American Cyanamid Company, Stamford, Conn., a corporation of Maine
Filed Mar. 24, 1967, Ser. No. 625,806
Int. Cl. H01m *15/04, 15/06*
U.S. Cl. 136—83                                10 Claims

ABSTRACT OF THE DISCLOSURE

Depolarizers for electric cells comprise charge transfer complexes which are reaction products of polynuclear aromatic compounds as donors with iodine, bromine, cyanogen iodide, or iodine monochloride as acceptors.

---

Figure 1:
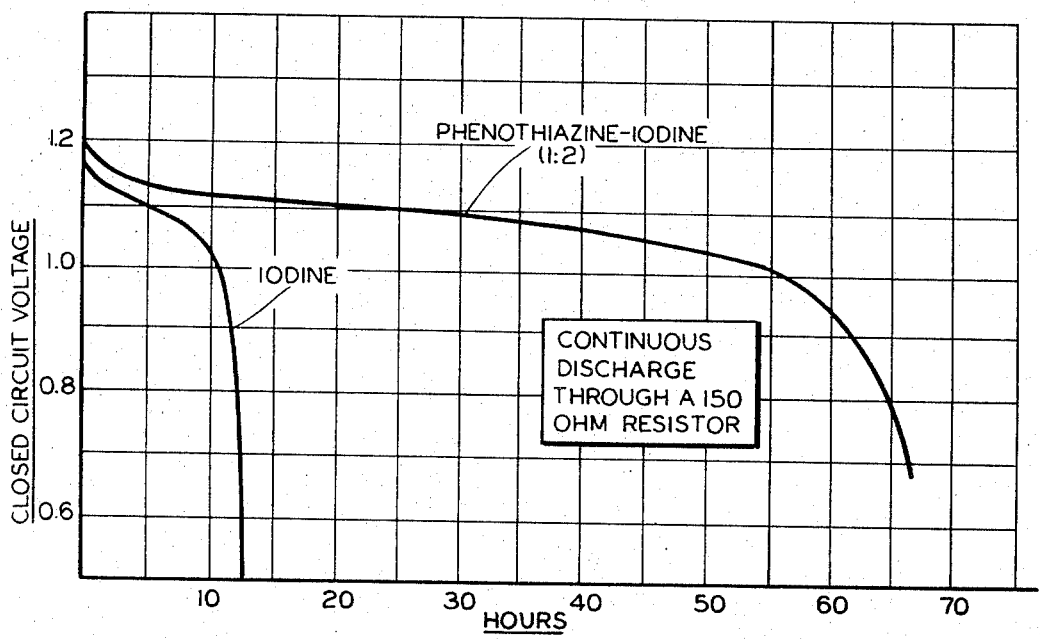

This invention relates generally to cathode depolarizers for both primary and secondary electric cells and particularly relates to certain charge transfer complexes as cathode depolarizers. The herein described depolarizers can be used in both aqueous and non-aqueous cells as well as in reserve cells.

Primary electric cells are cells which supply electric energy by conversion of chemical energy using a chemical reaction which is not easily reversible. Thus, after the cell has been used and discharged, it has no further use and is discarded. The most common type of primary cell is the so-called dry cell which uses a wet or moist cathode mix, but which is non-spillable. Primary cells may also be assembled except for the electrolyte, then activated just prior to use by the addition of water or an aqueous solution of the electrolyte. Such cells from which the electrolyte or water has been omitted and which are activated for use this way are known as reserve cells. Secondary cells are those which can be recharged repeatedly after discharge since they utilize a reversible chemical reaction.

Dry cells are extensively used and, in general, are composed of the following elements: an anode made of a metal which is located high in the electromotive series, such as aluminum, zinc, or magnesium or alloys thereof, a cathode of carbon, including a carbon rod to serve as a collector of electrons, a depolarizer, an electrolyte which can be, for example, a concentrated aqueous salt solution, and a separator. Th carbon, depolarizer and electrolyte are referred to as the cathode mix.

The depolarizer serves to maintain a satisfactory voltage under useful current loads. Depolarizers are oxidizers and for many decades the standard depolarizer for use in dry cells has been manganese dioxide. In order to obtain satisfactory distribution and conductivity the manganese dioxide is mixed intimately with finely divided carbon and electrolyte to produce the cathode mix surrounding the collector. The characteristics of such a cell are well-known in the art.

The voltage of a dry cell, its life under various discharge rates, and the maintenance of a minimum satisfactory voltage during a large part of its life are all important factors. While inorganic depolarizers, such as manganese dioxide, are operative and have been standard for many decades, they are by no means ideal. Extensive investigations have been carried out to develop better depolarizers and, as a result of these investigations, a number of organic compounds have been studied and found to have characteristics superior to those of manganese dioxide. One of these compounds is m-dinitrobenzene. When this compound, for example, is used in a cathode mix, the voltage is somewhat lower than that of a fresh manganese dioxide depolarized cell, but the cell has considerably higher capacity.

For best performance in batteries, materials are desired which give both a high initial voltage and a flat discharge curve with time, i.e., discharge accompanied with a minimum drop of voltage with time. Below a certain fixed voltage, the cell becomes unusable; even though there may yet be considerable energy present. In evaluating cells, a certain voltage is usually taken as a cut-off point below which the energy present is not considered usable.

In evaluating cells, a common method of comparison is to note the initial voltage and then determine the time required at a particular discharge rate (which simulates the discharge in its anticipated use) to reach a certain cut-off voltage point (below which the battery becomes inoperative), which may be in the range of 0.9 to about 0.75 volt. Illustratively, a cut-off voltage of 0.9 volt may represent a practical voltage figure below which the battery ordinarily becomes inoperative with portable battery operated equipment. With a flat discharge curve, a more uniform voltage is supplied over a normal period of time before the cell becomes inoperative.

The present invention is based on the discovery that certain charge transfer complexes are useful depolarizers in all kinds of electric cells and give superior results in various cell types under a variety of conditions.

The so-called charge transfer complexes are well known. They are molecular compounds formed by the interaction between electron donors and electron acceptors. The donors are molecules with low ionization potentials and the acceptors are molecules with high electron affinities.

These so-called charge transfer complexes have characteristic properties which include but are not limited to optical properties, electrical properties and magnetic properties.

The charge transfer complexes, as the term is used in this invention, are formed by the interaction of a wide variety of molecules, primarily aromatic types which behave as electron donors when used with electron acceptors such as quinones, nitro compounds and halogens. The present concept of the nature of these complexes involving the so-called charge transfer or donor-acceptor interaction theory is described by Millikin, Rec. Trav. Chim., 75, 845 (1956); this subject area was reviewed by McGlynn, Chem. Rev., 58, 1113 (1958).

A recent reference giving further detailed descriptions of the charge transfer complexes is "Organic Semiconductors," edited by Prof. H. Inokuchi, Institute for Solid State Physics of the University of Tokyo, Chapter 6.

The charge transfer complexes which have been found particularly useful in electric cells in accordance with this invention comprise reaction products of polynuclear aromatic organic compounds having at least two fused rings with selected halogens and pseudohalogen compounds. It is most important that the complexes have specific resistivities of less than 100 ohm-cm. and have a low vapor pressure. They should also have decomposition temperatures greater than 50° C.

As the donor organic polynuclear aromatic compound, it is preferred to use the phenothiazines, either phenothiazine itself or the alkyl substituted phenothiazines, such as the preferred methylphenothiazine and the like. Phenothiazines which are operable include phenothiazine, N-methylphenothiazine, and nuclear substituted phenothiazines, the nuclear substituent being methyl, ethyl, methoxy, ethoxy, alkylamino, dialkylamino, and halogen.

The acceptor compound can be a halogen such as iodine, bromine, or a pseudohalogen, such as iodine monochloride, or cyanogen iodide. It has been found that chlorine has the disadvantage of chlorinating the aromatic rings of the donor compound, while fluorine is altogether too reactive. Materials having an unduly high vapor pressure are also to be avoided.

It has been found that there are a number of properties which are essential for the useful charge transfer agents. They should be insoluble in the cell electrolyte. The agents should be non-reactive with the other ingredients in the cathode or separator of the cell. The complexes should be conductive; at least their resistivities should be low, i.e., less than about 100 ohm-cm. It is also desirable that there be an upper limit on the equivalent weight of the complex of about 200, although somewhat higher values for equivalent weights can be tolerated.

The equivalent weight of the complex for the purposes of use in a cell is the molecular weight of the complex divided by the number of electrons which may be accepted. It is a measure of oxidizing capacity. It is also preferred that the complex should be capable of a reversible redox reaction, if the complex is to be used in a secondary cell. For use in certain reserve cells, it should be a material which is capable of functioning where there is neither acid nor base present in the electrolyte.

The combinations of phenothiazine and iodine or N-methyl phenothiazine and iodine are particularly preferred, since they show high conductivity, have a relatively low molecular weight, are economically attractive and give the most depolarizing action per unit weight in the cell.

Various ratios of the halogen to the donor compounds may be prepared and used. In order to make the preferred charge transfer complexes of this invention, at least two moles of the selected halogen are used for each mole of the aromatic polynuclear compound. Although two moles are normally used, a minimum of one mole and a maximum of three moles may be used. In making the complexes, the selected aromatic compound is dissolved in a volatile organic solvent and the required amount of halogen or pseudohalogen, such as iodine or bromine, is added, preferably also in a solvent. The solvent is then removed by filtration or evaporation and the charge transfer complex isolated as a solid product.

The charge transfer complexes give superior results as depolarizers in both primary and secondary cells, including dry cells and reserve cells. These charge transfer complexes can be used with the carbon cathodic mix in dry cells using zinc, aluminum or magnesium anodes; in cells having magnesium anodes, magnesium salts may be used as electrolytes. When zinc anodes are used, manganese salts, ammonium chloride, and zinc chloride can be used as electrolytes, and when aluminum anodes are used, aluminum chloride can be the electrolyte. Alkali metal salts may be used since the cathode reaction does not require hydrogen ions.

The charge transfer complexes may also be used in reserve cells which may have compositions similar to those cited for dry cells except that no aqueous electrolyte is included in the cell when it is manufactured. Subsequently, the cell is activated when it is to be used by addition thereto of an aqueous solution of the desired electrolyte. With the charge transfer complex as the depolarizer, the cells may be activated with plain water or other naturally occurring water, such as sea water, which is a special advantage, the activated electrolyte forming from reduction of the complex. This is a special and a particular advantage possessed by these charge transfer complexes and not found with other organic depolarizers.

The charge transfer complexes of the invention show special advantages in both dry and reserve cells and under a variety of discharge conditions, including both fast and slow discharge. Because of the high conductivity of these charge transfer complexes, it is possible to employ very high ratios of organic depolarizer to carbon black which, in turn, makes possible production of higher capacity batteries. Cells with these complexes as depolarizers give relatively high voltage with flat discharge curves against time. These advantages are especially apparent using a 50-ohm resistance for discharge of a reserve cell.

It has further been found that there is a special advantage in that these charge transfer complexes may be used in cells designed for discharge to a certain predetermined time or voltage, whereupon there is an abrupt cut-off.

The invention will be further illustrated by the following examples, which are intended to be only by way of presenting specific embodiments. It is in no way intended to limit the invention thereto.

Example 1

A phenothiazine-iodine (1:2) complex can be prepared by initially making up two solutions. The first solution is made by dissolving 400 g. (3.15 moles) of iodine in 2500 ml. of 95% ethanol at 35° C. The second solution contains 150 g. (0.75 mole) of phenothiazine dissolved in 8000 ml. of 95% ethanol at 35° C. The second solution is added to the first with stirring. The resulting mixture is stirred at 40° C. for one hour, cooled to 5–7° C., filtered and the solid product air-dried to give a yield of 292 g. (55%). The iodine analysis of this product is 67.0% (theory 71.8% for 1:2 complex). The resistivity is about 1.4 ohm-cm.

"AA" size dry cells are prepared using (1) the phenothiazine-iodine complex and (2) using iodine itself as depolarizers. These cells are then examined for comparison discharge characteristics through a 150-ohm resistance. The batteries are made up in conventional design using zinc anodes with the following cathodic depolarizer formulations:

(1)

| | | |
|---|---|---|
| Phenothiazine-iodine complex (1:2) | grams | 3.9 |
| Acetylene black | do | 0.55 |
| Electrolyte (17% $ZnCl_2$ and 27% $NH_4Cl$) | ml | 1.7 |

(2)

| | | |
|---|---|---|
| Iodine | grams | 3.35 |
| Acetylene black | do | 0.96 |
| Electrolyte (17% $ZnCl_2$ and 27% $NH_4Cl$) | ml | 2.6 |

In the drawings:

FIGURE 1 is a chart with curves showing the discharge characteristics of these cells through a 150-ohm resistance. It is significant to note the high voltage and flat curve obtained with the phenothiazine-iodine complex. By contrast thereto, the iodine cell shows very litle depolarization activity characteristic of the complex and for the relatively poor characteristic of the iodine itself.

Figure 2:
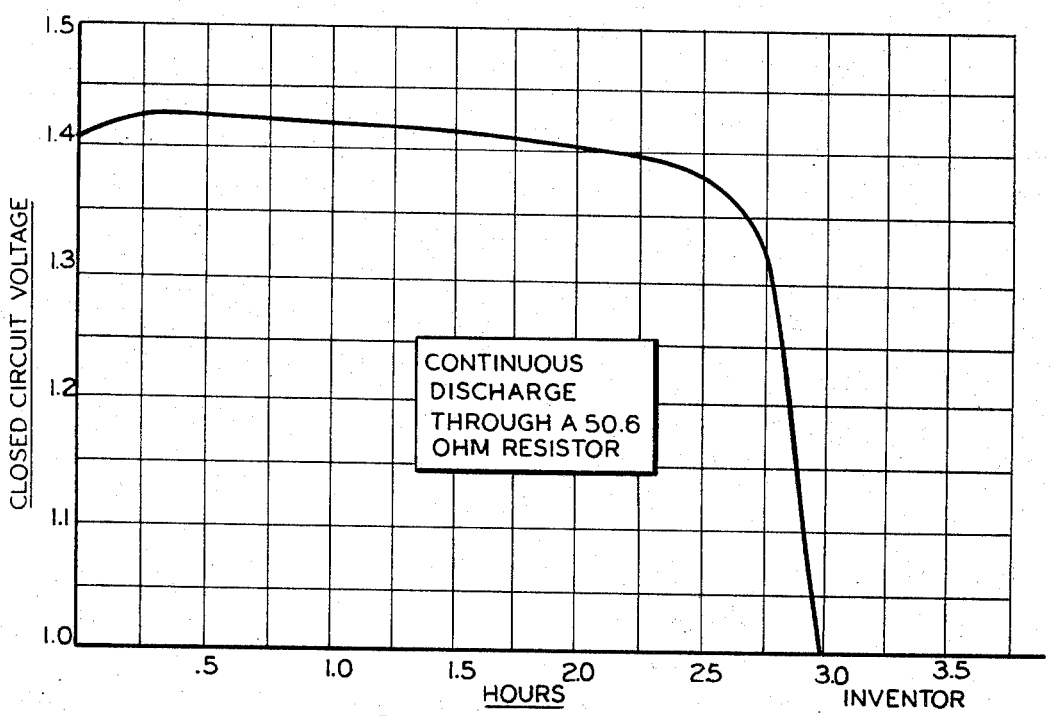

FIGURE 2 is a chart showing the discharge characteristics of a reserve cell of Example 2 through a 50.6-ohm resistance. It is important to note that the curve in this instance is quite flat but drops off very sharply and suddenly.

Example 2

A magnesium reserve cell is prepared using the phenothiazine-iodine (1:2) complex from Example 1 as a depolarizer and tested for its discharge properties on continuous discharge through a 50.6-ohm resistance, as shown in FIGURE 2.

A mixture of 0.765 gram of phenothiazine-iodine complex and 0.135 gram of high surface area carbon black is pressed in a Carver press to form a thick pellet or wafer about one inch in diameter and about 0.04 inch thick, using 5500 lbs. per square inch pressure. A sandwich type construction type cell is then made up of the following layers:

(1) A thin copper sheet as the contact or lead.
(2) The cathode pellet as prepared above.
(3) A Webril separator. (This is alpha-cellulose in the form of a matted cellulose sheet, and is used for absorption of the aqueous electrolyte.)
(4) A thin sheet of magnesium as the anode and lead.

This four-layer sandwich from 0.1 to 0.2 inch thick is wrapped in paper masking tape. For activation, it is dipped or submerged for three minutes in the activating solution (a 3% sodium chloride solution simulating seawater). It is then removed, the excess salt solution shaken off, and, after standing for seven minutes, it is put on load (10 minutes after zero time) discharge and found satisfactory.

This reserve cell test is designed for evaluation of reserve cells for special applications, particularly for radiosonde applications. Such cells should be stable in the presence of air and should be capable of being activated by water, sea-water, and the like. In addition, since such applications include those for use as power sources in weather ballons, signaling devices, telemetering systems, etc., it is desirable that these cells have very flat discharge curves with sudden and abrupt cut-offs at predetermined voltages and times. Among the reasons for this criterion is the avoidance of a gradual decrease in power resulting in decreasing weak signals over a long period. An underpowered source may also be responsible for a drift in oscillator frequency, so the obsolete signal may also drift in frequency.

Example 3

The N-methylphenothiazine-$I_2$ complex is prepared in the same manner as above described for the phenothiazine-$I_2$ complex except using 160 grams, 0.75 mole of N-methylphenothiazine. It was tested in a similar manner and found to be quite satisfactory. The resistivity of the complex is 10 ohm-cm.

Example 4

The complex between phenothiazine and ICl was also prepared and tested as a depolarizer. The complex is prepared from two solutions; one solution is made by dissolving 100 grams of ICl in 1200 ml. of chloroform, and the other solution is made by dissolving 48 grams of phenothiazine in 500 ml. of chloroform. The resulting solutions are mixed and the resulting slurry is stirred and cooled to $-10°$ C. Filtration of the slurry yields a black precipitate which analyzes as the 2:1 ICl-phenothiazine-complex. The yield of this product is 125 grams, or 85% of theory.

This product was tested as the depolarizer compound in a reserve cell. To prepare the test cell, a mixture of 0.85 gram of the complex and 0.15 gram of carbon (Columbian Carbon HR-1670) is ground in a mortar and pelletized in a press at about 35,000 p.s.i. to form a pellet 0.75 in. in diameter and 0.05 in. thick. The results were satisfactory.

Example 5

The charge transfer complex containing iodine as the acceptor and acridine as the organic compound complex was prepared and incorporated into a reserve cell by the same procedures as in experiments set forth herein above. The voltage obtained upon activation was about or below 1 volt. Also, it was found that the cell polarized somewhat.

I claim:
1. In an electric cell comprising in combination a metallic anode, a cathode composition comprising a mixture of carbon and an organic depolarizer, and a metal salt electrolyte, the improvement in which the organic depolarizer compound is a charge transfer complex having a specific resistivity of less than about 10 ohm-cm. and having a relatively low vapor pressure, which complex is the reaction product of a polynuclear aromatic compound having at least two fused rings as the donor and an acceptor selected from the group of iodine, bromine, iodocyanide, and iodochloride.
2. The cell of claim 1 wherein the polynuclear aromatic compound of said complex is phenothiazine.
3. The cell of claim 1 wherein the polynuclear aromatic compound of said complex is N-methylphenothiazine.
4. The cell of claim 1 wherein the cell is a dry cell.
5. The cell of claim 1 wherein the cell is a dry cell in which the phenothiazine-iodine complex is the depolarizer.
6. The cell of claim 1 wherein the cell is a reserve cell in which the phenothiazine-iodine complex is the depolarizer.
7. The cell of claim 1 in which the phenothiazine-iodochloride complex is the depolarizer.
8. A cathode composition especially adapted for use in a dry cell, which comprises a mixture of carbon, a metal salt electrolyte, and, as an organic depolarizer, a charge transfer complex having a specific resistivity of less than about 100 ohm-cm. and having a relatively low vapor pressure, which complex is the reaction product of a polynuclear aromatic compound having at least two fused rings as the donor and an acceptor selected from the group of iodine, bromine, iodocyanide, and iodochloride.
9. The cathode composition of claim 8 in which the phenothiazine-iodine complex is the organic depolarizer.
10. The cathode composition of claim 8 in which the phenothiazine-iodochloride complex is the depolarizer.

References Cited
UNITED STATES PATENTS

| | | | |
|---|---|---|---|
| 2,880,122 | 3/1959 | Morehouse et al. | 136—137 |
| 3,134,698 | 5/1964 | Neipert et al. | 136—100 |
| 3,152,017 | 10/1964 | Coleman et al. | 136—137 |
| 3,181,972 | 5/1965 | Smith | 136—90 |

OTHER REFERENCES

The Journal of Chemical Physics, vol. 33, No. 3, pages 868–871 (copy available in 252—500).

ALLEN B. CURTIS, *Primary Examiner.*

A. SKAPARS, *Assistant Examiner.*

U.S. Cl. X.R.

136—90, 121, 137